United States Patent
Garner et al.

(10) Patent No.: US 11,576,299 B2
(45) Date of Patent: Feb. 14, 2023

(54) WORK VEHICLE WITH COMMODITY METERING SYSTEM AND AIRFLOW SYSTEM

(71) Applicant: Deere & Company, Moline, IL (US)

(72) Inventors: Elijah B. Garner, Bettendorf, IA (US); Stanley R. Borkgren, Geneseo, IL (US); Keith L. Felton, Sherrard, IL (US); Andrew W. Harmon, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 380 days.

(21) Appl. No.: 16/733,387

(22) Filed: Jan. 3, 2020

(65) Prior Publication Data

US 2020/0137947 A1    May 7, 2020

Related U.S. Application Data

(62) Division of application No. 15/670,834, filed on Aug. 7, 2017, now Pat. No. 10,555,455.

(51) Int. Cl.
| | |
|---|---|
| *A01C 7/10* | (2006.01) |
| *A01C 7/20* | (2006.01) |
| *A01C 7/08* | (2006.01) |
| *A01C 7/12* | (2006.01) |

(52) U.S. Cl.
CPC .............. *A01C 7/102* (2013.01); *A01C 7/081* (2013.01); *A01C 7/123* (2013.01); *A01C 7/206* (2013.01)

(58) Field of Classification Search
CPC ......... A01C 7/102; A01C 7/081; A01C 7/123; A01C 7/206; A01C 7/10; A01C 7/08; A01C 7/00; A01C 7/12; A01C 7/20
See application file for complete search history.

(56) References Cited

U.S. PATENT DOCUMENTS

| | | |
|---|---|---|
| 9,844,174 B2 | 12/2017 | Gervais et al. |
| 2013/0019788 A1 | 1/2013 | Bragatto |
| 2016/0120108 A1* | 5/2016 | Gervais ................. A01C 7/123 111/178 |

FOREIGN PATENT DOCUMENTS

| | | |
|---|---|---|
| DE | 4315343 A1 | 11/1993 |
| DE | 202014009404 U1 | 3/2016 |
| DE | 102016112058 A1 | 1/2018 |
| DE | 102016012254 A1 | 4/2018 |
| WO | 9908504 A1 | 2/1999 |

OTHER PUBLICATIONS

Agco Corporation: Sunflower 2016 Seeding Tools, The Science of Seeding, Copyright 2015. 36 pages.
German search report for application No. 102018211011.5 dated Apr. 1, 2019. 12 pages.

* cited by examiner

*Primary Examiner* — Christopher J. Novosad
(74) *Attorney, Agent, or Firm* — Klintworth & Rozenblat IP LLP

(57) ABSTRACT

A work vehicle with a metering system, airflow system, and a covering structure moveable between various positions for user access includes features that facilitate assembly and/or disassembly of the metering system. The work vehicle has a venturi structure with a plurality of venturi tubes that are disposed in a compact arrangement.

20 Claims, 11 Drawing Sheets

WORK VEHICLE WITH COMMODITY METERING SYSTEM AND AIRFLOW SYSTEM

CROSS-REFERENCE TO RELATED APPLICATION(S)

This is a divisional application of U.S. application Ser. No. 15/670,834, filed Aug. 7, 2017, now allowed.

STATEMENT OF FEDERALLY SPONSORED RESEARCH OR DEVELOPMENT

Not applicable.

FIELD OF THE DISCLOSURE

This disclosure relates to work vehicles and implements, and more specifically, to a work vehicle with an improved volumetric metering system and/or an improved airflow system.

BACKGROUND OF THE DISCLOSURE

Work vehicles, such as air seeders and other seeding devices, are configured for applying seed, fertilizer, and/or other particulate commodities to a field. The work vehicle may also include tilling equipment for applying the commodity under the surface of the soil.

Work vehicles typically include one or more tanks and a metering system that meters out a predetermined quantity of the commodity from the tank as the work vehicle moves across the field. The metered particles move into a high velocity airstream generated by an airflow system of the vehicle. Once in the airstream, the particles are delivered to the soil.

SUMMARY OF THE DISCLOSURE

This disclosure provides a commodity-distributing work vehicle with various improvements. For example, the work vehicle of the present disclosure may include one or more features that increase accessibility of the metering system, the airstream system, and/or other areas. Some features may facilitate assembly and disassembly of these systems, for example, when cleaning out the machine. Also, the work vehicle may include a venturi structure with plural venturi tubes arranged in a compact manner.

In one aspect, the disclosure provides a work vehicle that includes a commodity container and a metering assembly configured to meter a commodity out from the commodity container along an axis. The work vehicle also includes an airflow structure that defines at least one air passage for an airstream. The airflow structure is supported for movement relative to the metering assembly between a first position and a second position. The airflow structure, in the first position, is configured to receive units of the commodity travelling generally along the axis to be introduced into the airstream. The airflow structure, in the second position, is spaced away from the metering assembly to provide unobstructed access to the metering assembly along the axis in an upstream direction.

In another aspect, a work vehicle is disclosed that includes a frame and a commodity container that is supported by the frame. The work vehicle also includes a metering system configured to meter a commodity out from the commodity container. The metering system includes a metering element and a plurality of commodity tubes configured to receive the commodity from the metering element. Furthermore, the work vehicle includes a covering structure with a panel that is supported on the frame for movement between a first position and a second position. The panel is substantially rigid. The panel, in the first position, covers the metering element and the plurality of commodity tubes. The panel, in the second position, exposes the metering element and the plurality of commodity tubes.

In an additional aspect, the disclosure provides a work vehicle that includes a commodity container and a metering system configured to meter a commodity out from the commodity container. The metering system includes a metering element, a support structure, and a latch mechanism with a biasing member. The latch mechanism is configured to move between a latched position and an unlatched position. The latch mechanism, in the latched position, retains the metering element to the support structure. The latch mechanism, in the unlatched position, releases the metering element from the support structure. The biasing member biases the latch mechanism toward the latched position. The latch mechanism is configured to move the metering element away from the support structure as the latch mechanism moves from the latched position toward the unlatched position.

In a further aspect, a metering system is disclosed for a work vehicle. The metering system includes a support structure with a passage. The metering system also includes a divider member having a barrier wall and a retainer. The barrier wall includes a notch. The retainer attaches the divider member to the support structure. The metering system further includes a rotatable metering element with a shaft and a projection that projects from the shaft substantially in a radial direction. The shaft is removably received within the notch. The rotatable metering element is configured to rotate within the notch relative to the support structure such that the projection meters out a commodity into the passage of the support structure. The barrier wall directs at least some of the commodity into the passage.

In another aspect, an airflow structure of a work vehicle is disclosed that includes a first venturi tube and a second venturi tube. The airflow structure also includes a support structure that is fixed to the first venturi tube and the second venturi tube. The support structure includes a first passage that is fluidly connected to the first venturi tube, a second passage that is fluidly connected to the second venturi tube, and a divider wall between the first passage and the second passage.

In an additional aspect, a work vehicle is disclosed that includes a frame defining a front end and a rear end. The work vehicle also includes a commodity container that is supported on the frame and that is configured to hold a commodity. The work vehicle also includes a volumetric metering assembly disposed proximate the rear end of the frame. The metering assembly includes a rotatable metering element configured to rotate to meter out the commodity from the commodity container. Also, the work vehicle includes an airflow system that is disposed proximate the rear end of the frame. The airflow system includes an airflow structure configured to receive the commodity metered out from the metering system. The airflow structure includes a plenum and a venturi. The plenum is configured to deliver an airstream to the venturi. The venturi is configured to accelerate the airstream with the commodity therein away from the work vehicle. The metering assembly is manually accessible at the rear end of the work vehicle.

BRIEF DESCRIPTION OF THE DRAWINGS

Like reference symbols in the various drawings indicate like elements.

DETAILED DESCRIPTION

Figure 1:
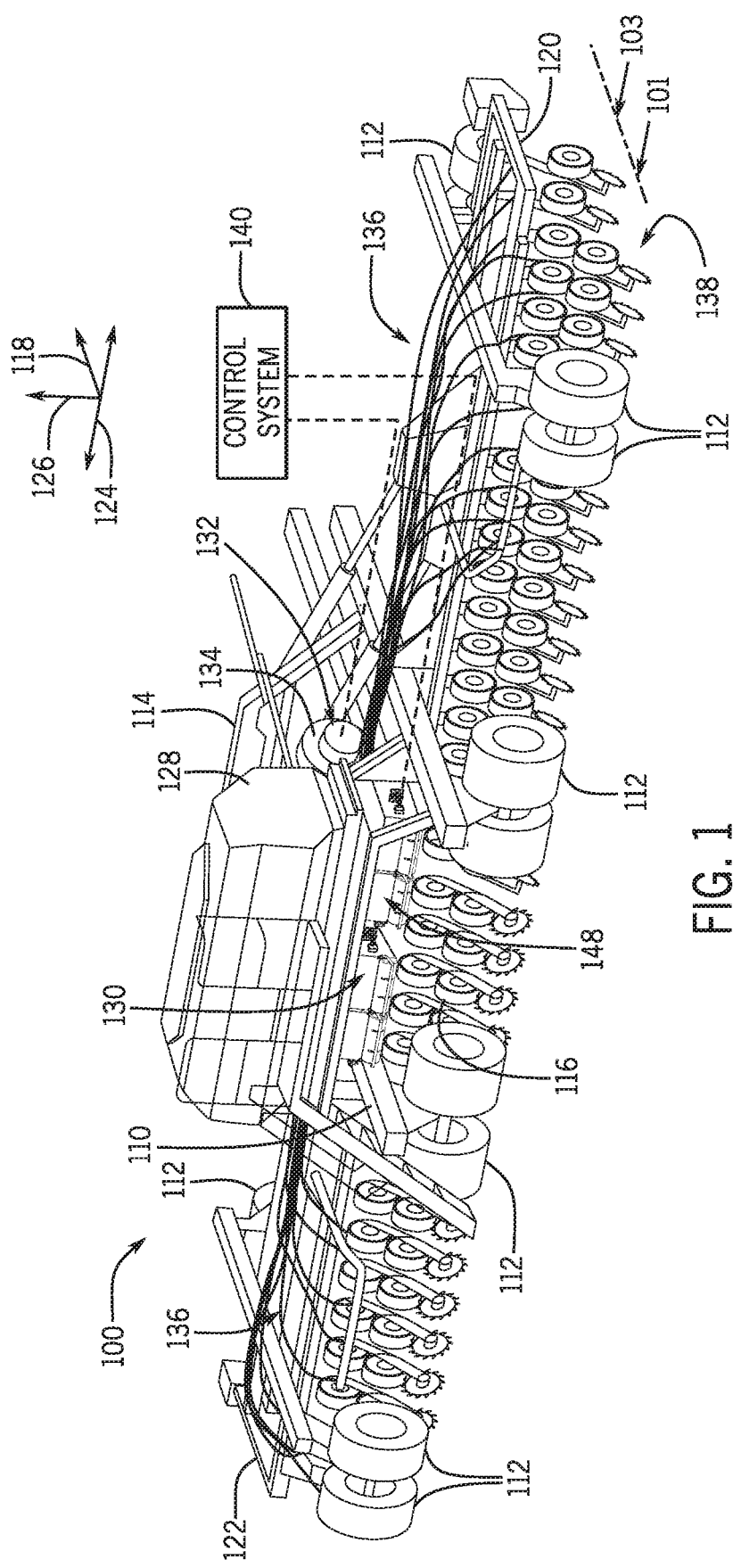
FIG. 1 is a rear perspective view of a work vehicle according to example embodiments of the present disclosure.

The following describes one or more example embodiments of a work vehicle, its metering system, its airflow system, and more, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicle described herein is merely one exemplary embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed work vehicle for metering and delivering a commodity to the soil, as shown in the accompanying figures of the drawings described briefly above. Generally, the disclosed work vehicle improves access to the metering system, the airflow system, and/or other areas of the machine for more convenient clean out, as compared to conventional systems. The disclosed work vehicle also includes features that facilitate assembly and/or disassembly of the metering system. Furthermore, the work vehicle of the present disclosure provides an airflow structure that is more effective, more compact, and/or more convenient to install and replace than those of the prior art.

FIG. 1 illustrates a work vehicle 100 according to example embodiments of the present disclosure. The work vehicle 100 may be towed by another vehicle, such as a tractor. Thus, the work vehicle 100 may be a towed work vehicle. In other embodiments, the work vehicle 100 of the present disclosure may be a self-propelled vehicle. In some embodiments, the work vehicle 100 may be an air cart or air drill. It will be appreciated that the illustrated work vehicle 100 is an example embodiment. One or more features of the present disclosure may be included on a different work vehicle, such as a planter, a commodity cart, or other work vehicle without departing from the scope of the present disclosure.

The work vehicle 100 includes a front end 114 and a rear end 116, and a fore-aft axis 118 extends generally between the front and rear ends 114, 116. The work vehicle 100 also includes a first side 120 and a second side 122, and a lateral axis 124 extends generally between the first and second sides 120, 122. A vertical axis 126 extends perpendicular to both the fore-aft axis 118 and the lateral axis 124.

Generally, the work vehicle 100 may include a chassis 110 and a plurality of wheels 112. The chassis 110 may be a rigid frame that supports the components described in detail below. The wheels 112 may support the chassis 110 and enable movement of the vehicle 100 across the field.

The work vehicle 100 may also include one or more commodity containers 128. The container 128 may be supported on the chassis 110 and disposed proximate the rear end 116. Also, in some embodiments, the container 128 may be disposed centrally between the first side 120 and the second side 122. The commodity container 128 may contain seed, fertilizer, and/or another particulate or granular commodity.

Additionally, the work vehicle 100 may include a metering system 130. The metering system 130 may be a volumetric metering system. The metering system 130 may be disposed generally underneath the commodity container 128 in some embodiments. As such, particles of the commodity within the container 128 may fall due to gravity toward the metering system 130. The metering system 130 may operate to meter out the commodity (e.g., by volume) from the container 128 at a controlled rate as the vehicle 100 moves across the field.

The work vehicle 100 may also include an airflow system 132. The airflow system 132 may include a fan 134 that generates a flow of air. The airflow system 132 may also include a plurality of airflow structures (e.g., plenums, tubes, lines, etc.) that receive the air blowing from the fan 134. Particles of the commodity (metered out by the metering system 130) may fall into the air stream and may flow to a distribution system 136. The distribution system 136 may include a plurality of hoses, lines, or other conduits that extend to different areas of the vehicle 100 along the lateral axis 124. The particles of the commodity may be propelled by the airstream through the distribution system 136 toward the soil. The work vehicle 100 may also include a ground system 138 with openers, tillers or other similar implements that prepare the soil for delivery of the seed, fertilizer, or other commodity delivered by the distribution system 136.

Moreover, the work vehicle 100 may include a control system 140. The control system 140 may be in communication with and may be configured for controlling the metering system 130, the airflow system 132, and/or other components of the work vehicle 100. The control system 140 may be wholly supported on the work vehicle 100, or the control system 140 may include components that are remote from the vehicle 100. The control system 140 may be in electronic, hydraulic, pneumatic, mechanical, or other communication with the metering system 130, the airflow system 132, etc. In some embodiments, the control system 140 may be in communication with actuators, sensors, and/or other components of the work vehicle 100.

During operation of the work vehicle 100 (e.g., when towed by a tractor or other towing vehicle across a field), the commodity may fall from the container 128 toward the metering system 130. The control system 140 may control the metering system 130 (e.g., by controlled actuation of a motor or other actuator), which allows a controlled quantity of particles to pass into the airflow system 132 at a predetermined rate. The control system 140 may also control the fan 134 for generating a continuous airstream that blows through the airflow system 132, receives the particles metered out from the metering system 130, and flows through the distribution system 136 across the work vehicle 100 to the soil.

The work vehicle 100 may include one or more components that are mounted for movement, for example, relative to the chassis 110. In some situations, the user may need to move these components when cleaning out the work vehicle 100. In some embodiments, these components may be mounted such that a single person can move these components. In some embodiments, the user may move and/or remove these components manually, by hand, and without the aid of extra tools. These components, their construction, and their methods of use and assembly provide substantial improvements. For example, the work vehicle 100 of the present disclosure may facilitate disassembly, re-assembly, clean-out, repair, part replacement, and more.

These components will be discussed in greater detail with reference to FIGS. 2-5, which show in detail a portion of the work vehicle 100. In particular, a central assembly 148 of the work vehicle 100 is shown. The central assembly 148 may be supported on the chassis 110, proximate the rear end 116 of the vehicle 100. Also, in some embodiments, the central assembly 148 may define portions of the commodity container 128, the metering system 130, and/or the airflow system 132.

Figure 2:
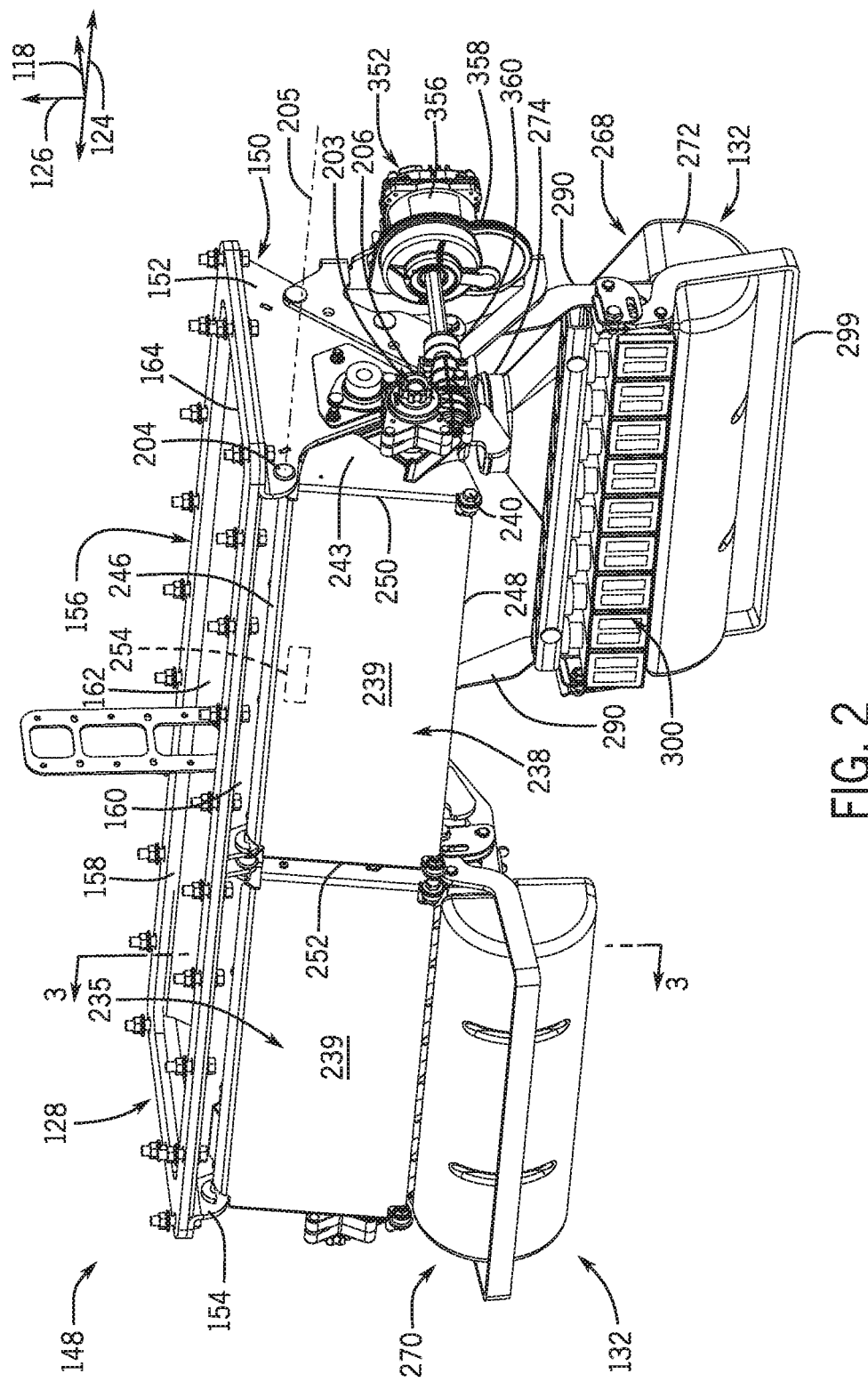
FIG. 2 is a rear perspective view of a portion of the work vehicle of FIG. 1 that includes a metering assembly and a plenum assembly.

Referring initially to FIG. 2, the central assembly 148 may include a frame 150 with a first plate 152 and a second plate 154 that are separated at a distance along the lateral axis 124. The first and second plates 154 may be strong, rigid members made, for example, from steel, aluminum, or other metal. In some embodiments, the first and second plates 152, 154 and/or other portions of the frame 150 may be fixed to the chassis 110 of the vehicle 100. As will be discussed, the first and second plates 152, 154 may support other components of the central assembly 148.

Figure 4:
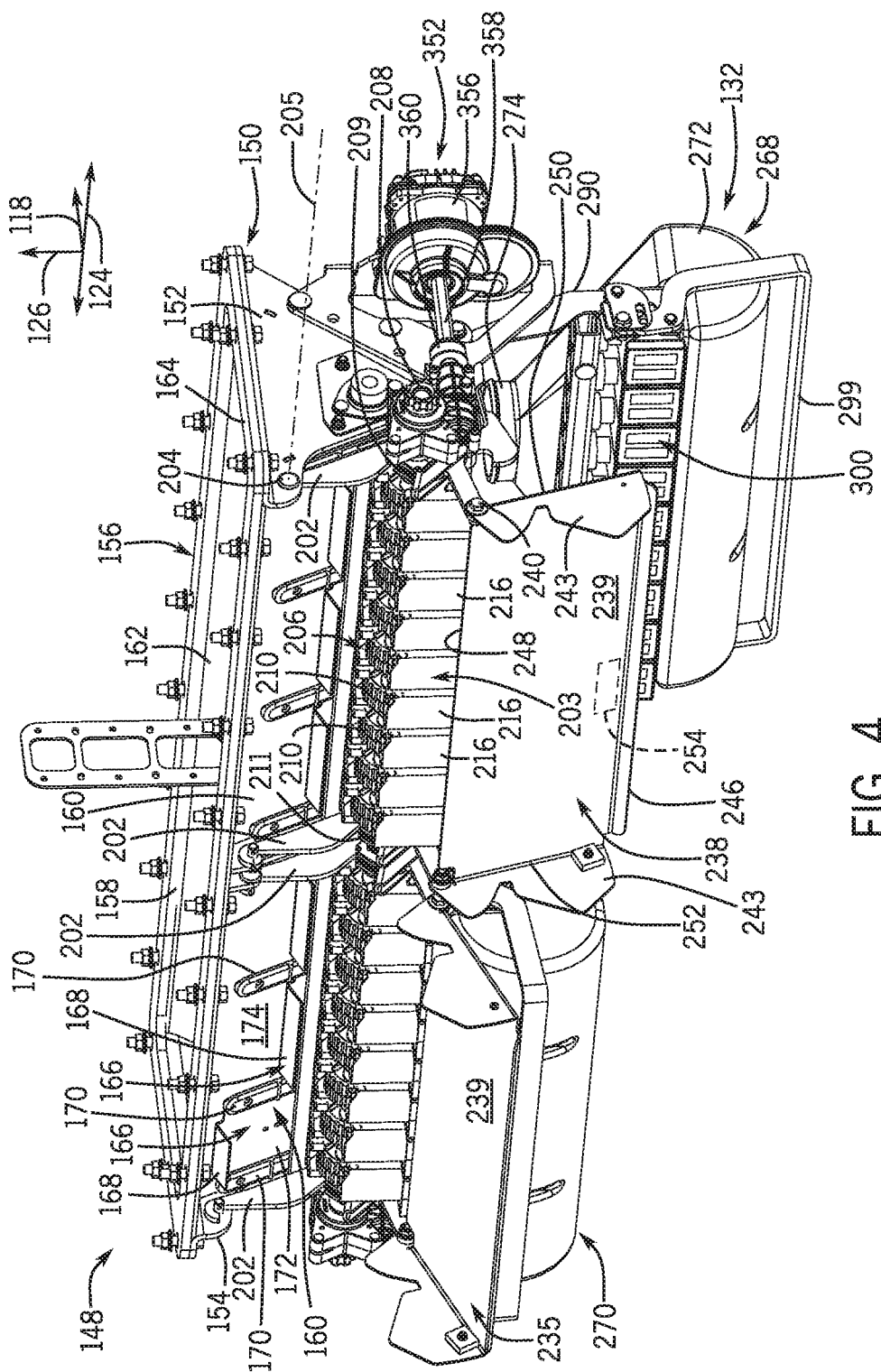
FIG. 4 is a rear perspective view, wherein moveable parts of the metering assembly and plenum assembly are shown in various positions.

As shown in FIGS. 2 and 4, the central assembly 148 may further include a trough member 156. The trough member 156 may be generally box-shaped with an open top end 158. The trough member 156 may include a rear wall 160 that faces generally toward the rear end 116 of the vehicle 100. The trough member 156 may also include an opposite front wall 162. The trough member 156 may further include an upper lip 164 that defines the open top end 158.

The trough member 156 may be elongate along the lateral axis 124 between the first plate 152 and the second plate 154. The upper lip 164 may be supported atop and fixed to the first plate 152, the second plate 154 and/or other portions of the frame 150. The trough member 156 may receive the seed, fertilizer, or other commodity within the commodity container 128 (FIG. 1). The commodity may collect within the trough member 156.

Figure 3:
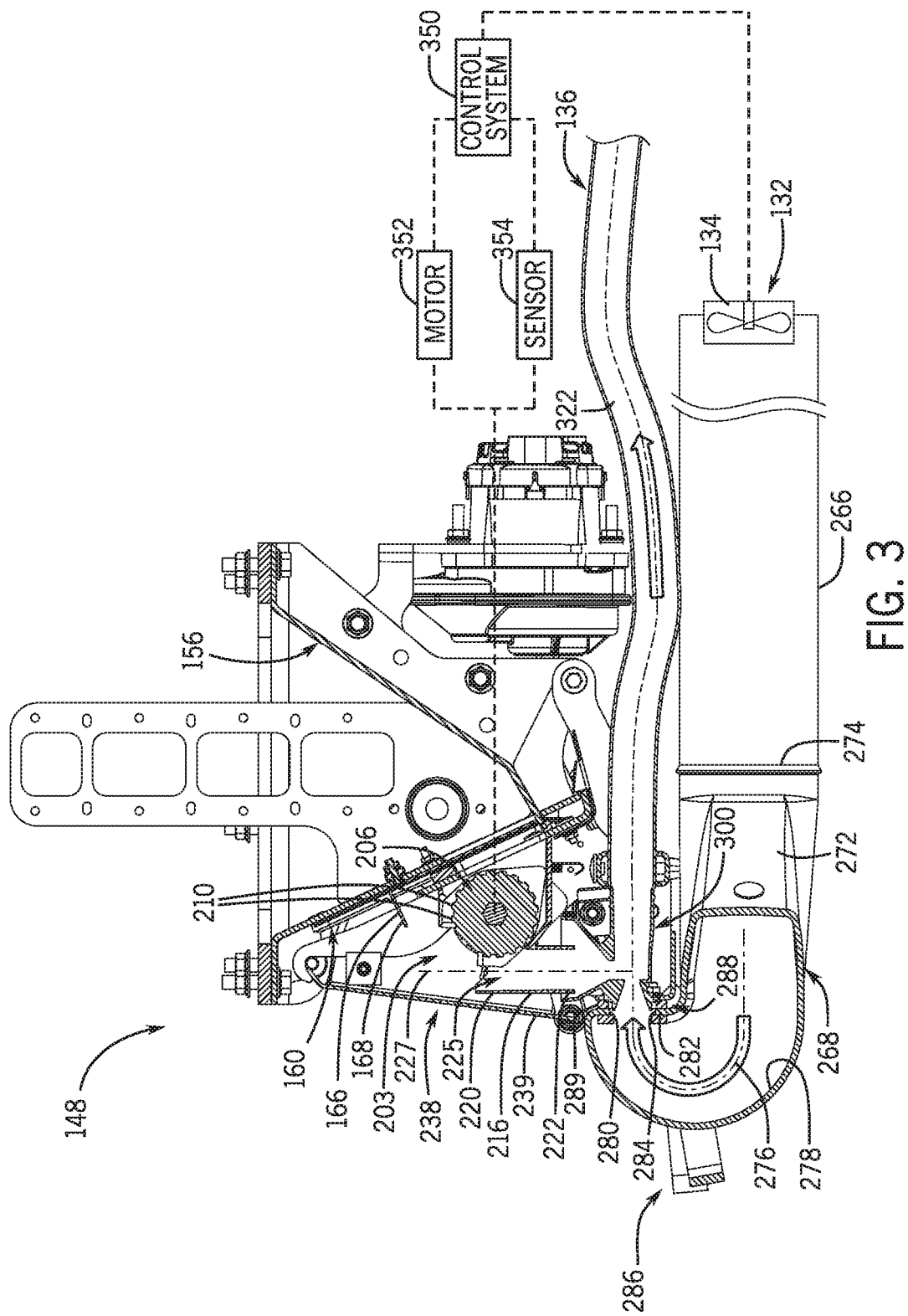
FIG. 3 is a section view of the central assembly taken along the line 3-3 of FIG. 2.

As shown in FIGS. 3 and 4, the rear wall 160 of the trough member 156 may include one or more wall members 166. In some embodiments, a representative wall member 166 may be substantially thin, flat plate with an upper flange 168. The wall member 166 may be mounted for movement to a respective support member 170 (FIG. 4). In some embodiments, the wall member 166 may be slideably supported by support members 170 (i.e., slider supports) on opposite edges of the wall member 166. Accordingly, the wall member 166 may slide upward to a raised position and slide downward to a lowered position. (In FIG. 4, an end wall member 172 is shown in the raised position, and the remaining wall members 166 are shown in the lowered position.) In some embodiments, the wall members 166 may be controlled by an actuator, such as a mechanical linear actuator, a solenoid, etc. The control system 140 may control the actuator for controlled movement of the wall members 166. It will be appreciated that the wall member 166 may be positioned in the raised position, the lowered position, and any number of intermediate positions. The position of the wall member 166 may control the size (i.e., area) of a rear opening 174 of the trough member 156.

The commodity may pass out of the trough member 156 via the rear openings 174 and fall toward the metering system 130 as will be discussed in greater detail below. Thus, when raised, the wall members 166 may increase the flow of commodity out of the trough member 156. On the contrary, when lowered, the wall members 166 may impede flow of commodity out of the trough member 156.

Referring now to FIGS. 4, 5, 11, and 12, the metering system 130 will be discussed in greater detail according to example embodiments. In some embodiments, the metering system 130 may be a volumetric metering system. In other embodiments, the metering system 130 may include be a singulating meter.

As shown in FIG. 4, the metering system 130 may include at least one metering assembly 203. In the illustrated embodiment, there are two metering assemblies 203 that extend along the lateral axis 124 of the vehicle 100. One of the metering assemblies 203 is proximate the first side 120 of the vehicle 100, and the other metering assembly 203 is proximate the second side 120. The metering assemblies 203 may be substantially similar.

Figure 11:
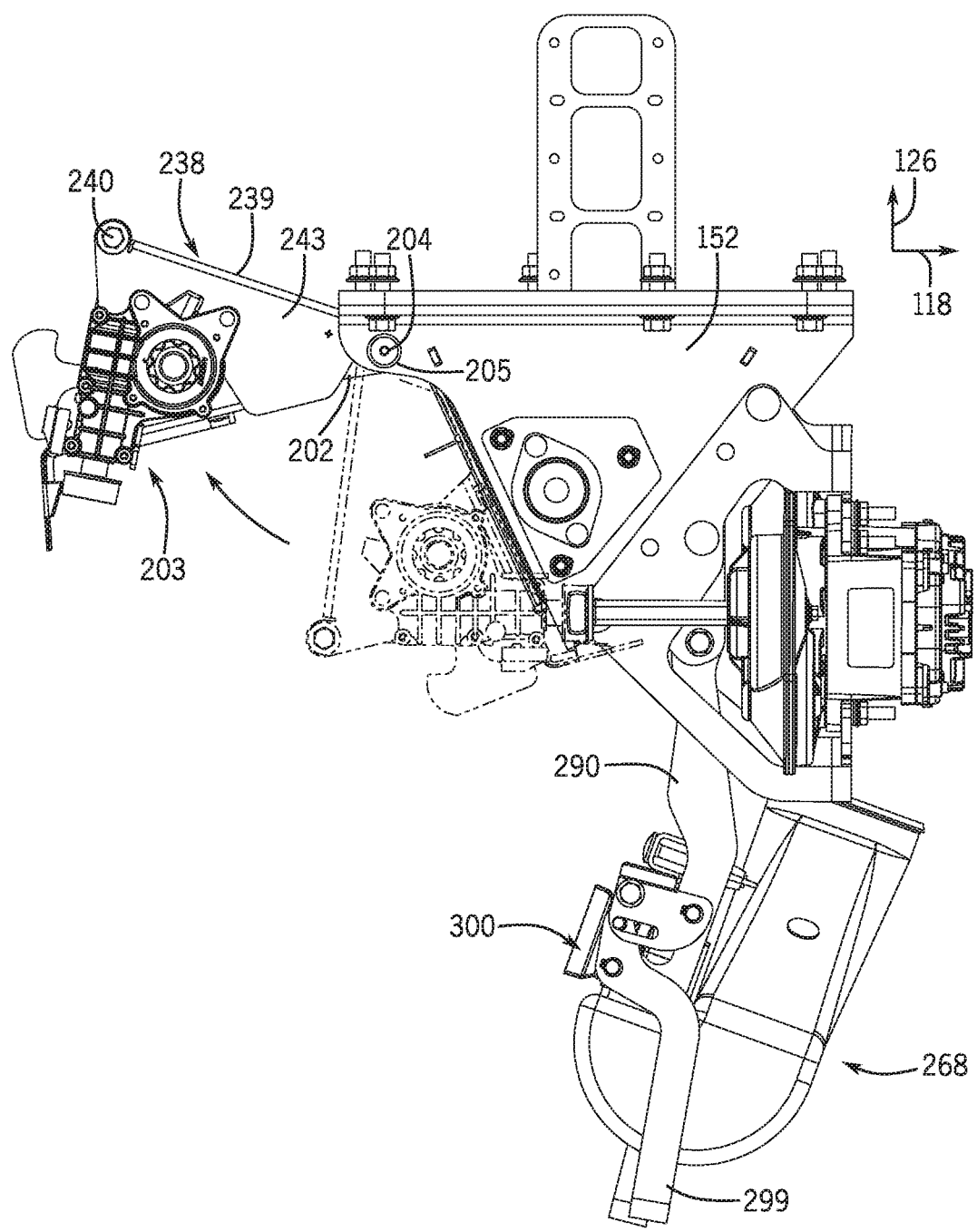
FIG. 11 is a section view showing movement of the metering assembly from a retracted position to an extended position.
Figure 12:
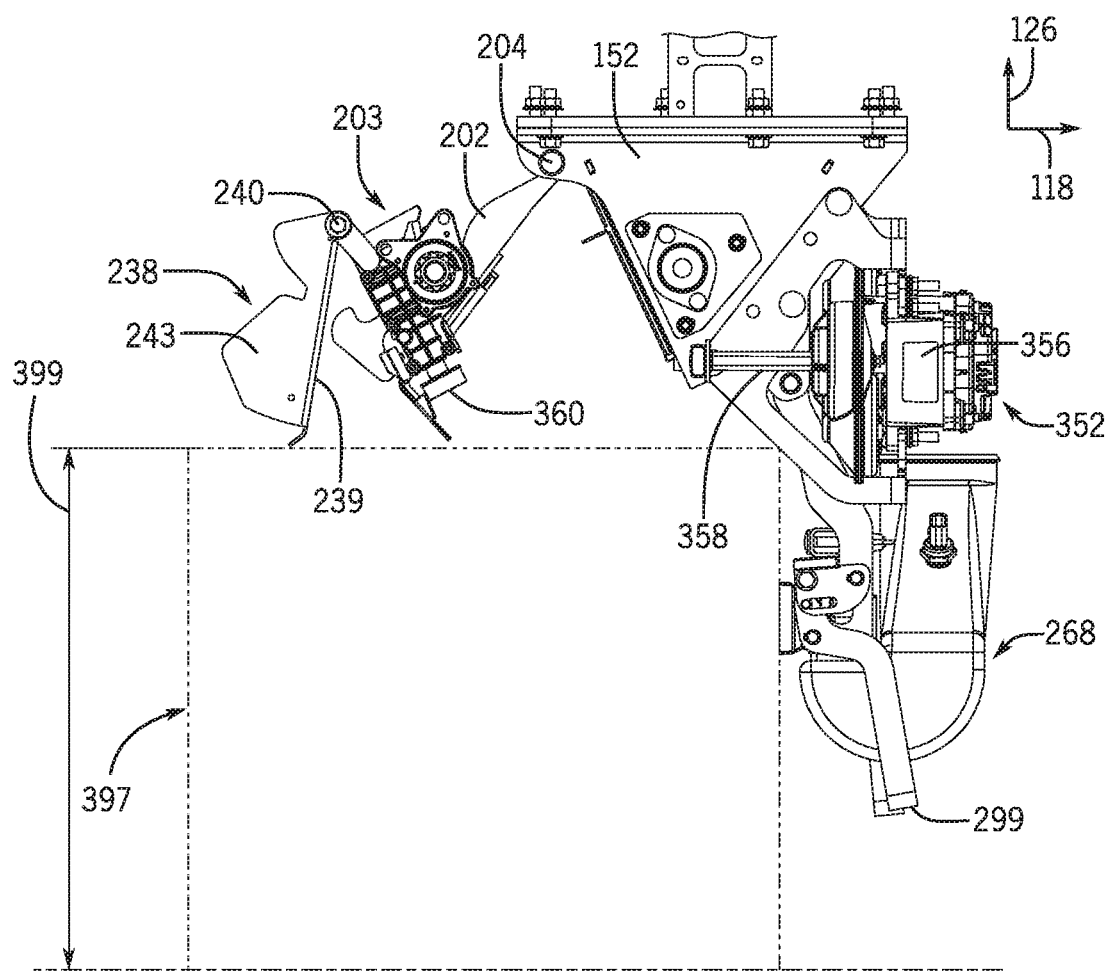
FIG. 12 is a section view showing the plenum assembly in the lowered position, the metering assembly in the extended position, and a covering structure of the metering assembly shown in an extended position.

As an example, the metering assembly 203 may be supported on one or more metering support structures 202 (FIGS. 4 and 12). In the illustrated embodiment, the metering assembly 203 may include at least two support structures 202 with one at each lateral end of the metering assembly 203. The support structures 202 may be substantially similar to each other. The metering support structure 202 may be a rigid member made, for example, from bent, welded, or otherwise formed steel plate. The metering support structure 202 may be elongate and may be pivotally attached at a first joint 204 to the frame 150. More specifically, the metering support structure 202 may be rotatably attached to the plate 152 by a pin, a hinge, a bearing, or other fastener. In some embodiments, the metering assembly 203 may rotate about an axis of rotation that extends substantially parallel to the lateral axis 124. Accordingly, as shown in FIG. 11, the metering assembly 203 may rotatably move between a between a first position (i.e., a retracted or lowered position) (shown in phantom) and a second position (i.e., an extended or raised position) (shown in solid lines) relative to the frame 150. As shown, the metering assembly 203 may swing generally rearward toward the rear end 116 of the vehicle 100 and upward (i.e., clockwise as viewed in FIG. 11) when moving from the first position to the second position.

In some embodiments, the metering assembly 203 may also include one or more retainers that selectively retain the metering assembly 203 in the first position, in the second position, and/or in an intermediate position. The retainer may include a latch, a prop bar, a fastener, or other structures. Furthermore, the metering assembly 203 may be manually moved by one person and by-hand (i.e., without the aid of additional tools). Thus, the metering assembly 203 may be easily moved, for example, when cleaning-out the metering assembly 203. In addition, as shown in FIG. 11, the metering assembly 203 may have a large range of motion for moving between the first and second positions.

Accordingly, the interior components described in detail below may be highly accessible for cleaning, repair, etc.

Moreover, the central assembly 148 may further include a first covering structure 238 and a second covering structure 235. The first and second covering structures 238, 235 may be substantially similar to each other.

As a representative example, the covering structure 238 may include a relatively flat panel 239. The panel 239 may be made from sheet metal and may be substantially rigid in some embodiments. The panel 239 may also be rectangular and may include a first edge 246, a second edge 248, a first side edge 250, and a second side edge 252.

Furthermore, the covering structure 238 may include one or more covering support structures 243 (FIGS. 2, 4, and 12). In the illustrated embodiment, the covering structure 238 may include at least two support structures 243 with one at each lateral end of the panel 239. The support structures 243 may be substantially similar to each other. The covering support structure 243 may be a rigid member made, for example, from bent, welded, or otherwise formed steel plate. The covering support structure 243 may be elongate and may be pivotally attached at a second joint 240 to the support structure 202 of the metering assembly 203. More specifically, the covering support structure 243 may be rotatably attached to the metering support structure 202 by a bracket, a hinge, a pin, a bearing, or other hardware. Also, the second joint 240 may be disposed proximate the second edge 248 (i.e., the lower edge) of the panel 239. The covering support structure 243 may rotate about an axis of rotation that extends substantially parallel to the lateral axis 124.

Accordingly, the first covering structure 238 and the second covering structure 235 may independently move relative to the respective metering assembly 203 between a number of positions. In some embodiments, the covering structures 238, 235 may have a first position (FIG. 2), wherein the panels 239 cover over the rear-facing portions of the metering assemblies 203. In FIG. 4, the second covering structure 235 is shown in a second position, wherein the panel 239 has rotated (flipped) downward to be substantially parallel to the ground and to expose the metering assembly 203. Also, in FIG. 4, the first covering structure 238 is shown in a third position, wherein the panel 239 has rotated (flipped) further downward to be more perpendicular to the ground and wherein the metering assembly 203 is exposed.

In some embodiments, the covering structures 238, 235 may include one or more retainers that selectively retain the panel 239 in the first position, the second position, and/or the third position. For example, as shown in FIG. 2, the retainer may include at least one magnetic element 254 that releasably and magnetically retains the panel 239 in the first position. The magnetic element 254 may be a permanent magnet supported on the panel 239, proximate the first edge 246. The magnetic element 254 may magnetically attach to the metallic material of the trough member 156 in some embodiments. In other embodiments, the covering structures 238, 235 may include different retainers, such as a mechanical latch. It will be appreciated that the retainers are optional and that, in additional embodiments, the covering structure 238, 235 may be self-supporting such that the panel 239 remains stationary and fixed in the first position due to the way that its weight is distributed on the metering assembly 203 at the first position.

The covering structures 238, 235 provide several advantages. For example, the covering structures 238, 235 may selectively cover over the metering assembly 203, protecting these components from the elements, from dust, and other foreign objects. Moreover, the covering structures 238, 235 may be easily moved to expose the metering assembly 203, for example, during clean-out, repair, etc.

It is also noted that the metering assembly 203 is highly accessible. Indeed, the covering structure 238, 235 may be moved relative to the metering assembly 203 to expose the rear-facing portions of the metering assembly 203. Also, the metering assembly 203 may be moved relative to the frame 150 to expose the front-facing portions of the metering assembly 203.

Referring now to FIGS. 4, 6, 8, and 9, components of the metering assembly 203 will be discussed according to example embodiments of the present disclosure. As shown, the metering assembly 203 may include a metering element 206. In some embodiments, the metering element 206 may be a rotatable metering element 206 that provides volumetric metering. The metering element 206 may be referred to as a roller or a roller cartridge.

The rotatable metering element 206 may include a shaft 208 with a first end 209 and a second end 211 (FIG. 4). The shaft 208 may have a relatively straight axis that extends substantially parallel to the lateral axis 124. The metering element 206 may also include a plurality of wheels 210 that are supported on the shaft 208. The wheels 210 may include a plurality of projections 212 that project radially away from the wheel 210.

Figure 8:
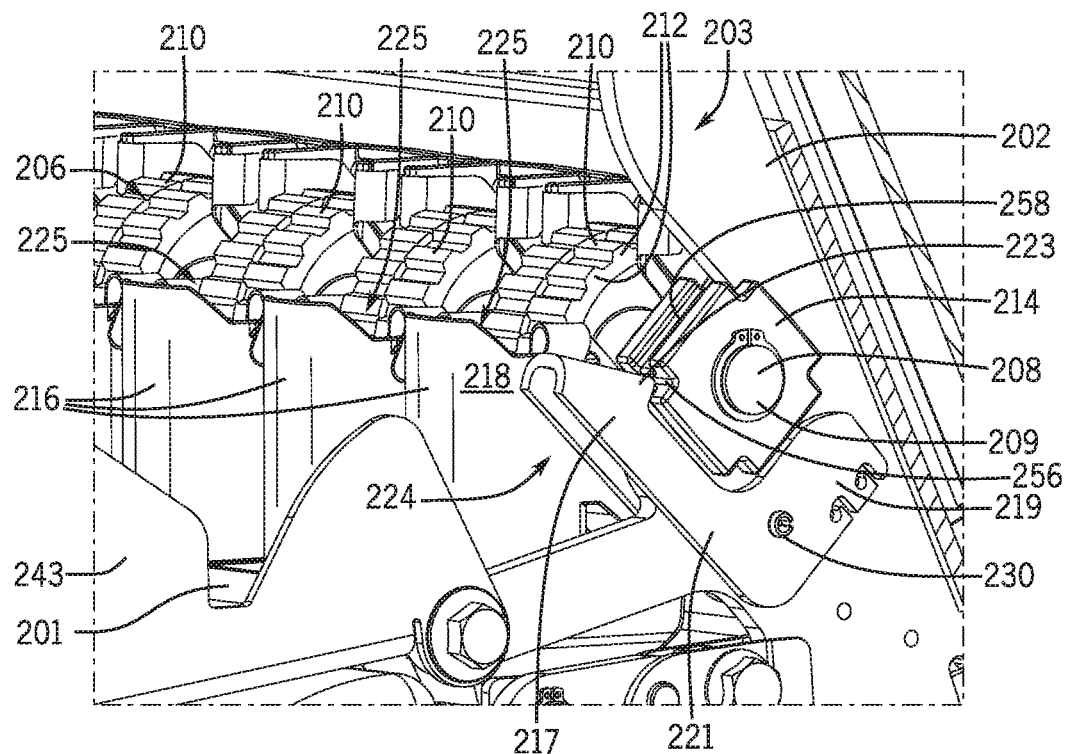
FIG. 8 is a perspective view of the metering assembly of FIG. 2, wherein a roller cartridge is shown in a latched position.
Figure 9:
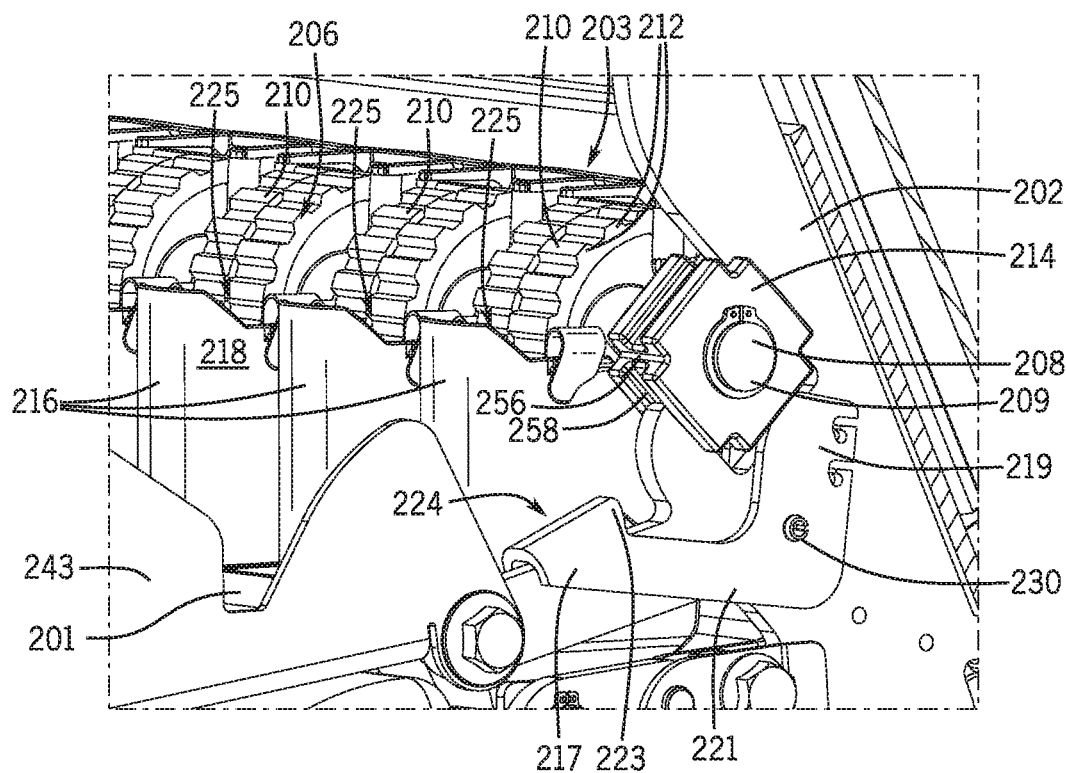
FIG. 9 is a perspective view of the metering assembly of FIG. 2, wherein the roller cartridge is shown in an unlatched position.

Additionally, the metering element 206 may include at least bearing structure 214 (FIGS. 8 and 9). For example as shown in FIG. 8, there may be a bearing structure 214 that rotatably supports the first end 209 of the shaft 208. Although not shown, there may also be a bearing structure 214 that rotatably supports the second end 211 of the shaft. The bearing structure 214 may include an outer structure (e.g., an outer race of the bearing) that is configured to releasably attach to the metering support structure 202. In some embodiments, the bearing structure 214 may be rectangular or cruciform in shape and may include one or more (e.g., four) grooves 258. The bearing structure 214 may be received in an opening of the metering support structure 202, and one or more of the grooves 258 may receive an edge of the metering support structure 202 to support the bearing structure 214 thereon.

As shown in FIGS. 8 and 9, the metering assembly 203 may further include a latch mechanism 224. The latch mechanism 224 may include a lever 221 with a first portion 217 and a second portion 219 that are separated at a distance. In some embodiments, the lever 221 may be generally L-shaped. Also, the first portion 217 of the lever 221 may include a hook feature 223. The lever 221 may be attached to the metering support structure 202, and the lever 221 may rotate between a latched position (FIG. 8) and an unlatched position (FIG. 9). In the latched position, the hook feature 223 may engage the bearing structure 214 of the metering element 206. For example, the hook feature 223 may be received within a notch 256 of the bearing structure 214 for engagement and attaching the metering element 206 to the metering support structure 202. When the latch mechanism 224 is in the unlatched position, the hook feature 223 may be disposed outside the notch 256 to release the bearing structure 214.

Additionally, in some embodiments, the latch mechanism 224 may include a biasing member 230. The biasing member 230 may include a spring, such as a compression spring, a torsion spring, etc. The biasing member 230 may bias the lever 221 toward the latched position (FIG. 8). Accordingly, when unlatching the metering element 206, the user may press against the first portion 217 of the lever 221, against the biasing force provided by the biasing member 230 until the hook feature 223 moves out of the notch 256.

Moreover, in some embodiments, as the lever 221 rotates toward the unlatched position, the second portion 219 may rotate toward and abut against the bearing structure 214 and push the metering element 206 away from the metering support structure 202. Accordingly, the lever 221 may assist the user in removal of the metering element 206 from the metering support structure 202 for added convenience.

When re-assembling the metering element 206, the user may press the bearing structure 214 of the metering element 206 against the latch mechanism 224 and move the lever 221 toward the unlatched position. The user may continue pushing the bearing structure 214 into place, allowing the biasing member 230 to bias the hook feature 223 into engagement with the bearing structure 214.

Figure 6:
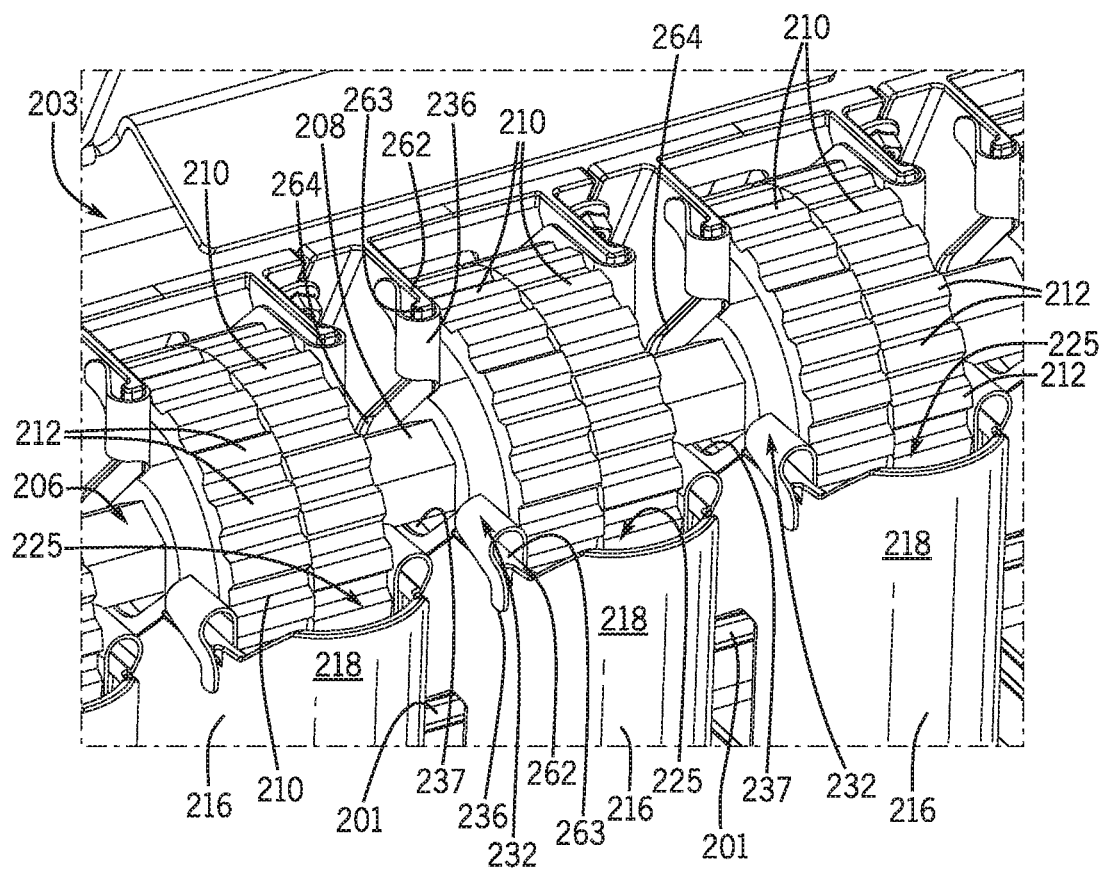
FIG. 6 is a perspective view of the metering assembly of FIG. 2.

As shown in FIGS. 3, 4, 6, 8 and 9, the metering assembly 203 may further include a plurality of commodity tubes 216. The commodity tubes 216 may be referred to as commodity cups. As an example, the commodity tube 216 may include a plurality of side walls 218 (FIGS. 6, 8, and 9). The side walls 218 may be arranged about a tube axis 227 (FIG. 3) so as to define a passage 225. The passage 225 may have a first end 220 and a second end 222 (FIG. 3). The commodity tubes 216 may be supported by one or more transverse support bars 201, which extend between the metering support structures 202. As such, the first end 220 of the commodity tube 216 may be disposed proximate the metering element 206 for receiving the commodity. Also, as shown in FIG. 6, an opposing pair of the side walls 218 may define a notch 264 in the commodity tube 216. The notch 264 may extend at an angle relative to the tube axis 227. The notch 264 may receive the shaft 208 of the metering element 206.

Figure 7:
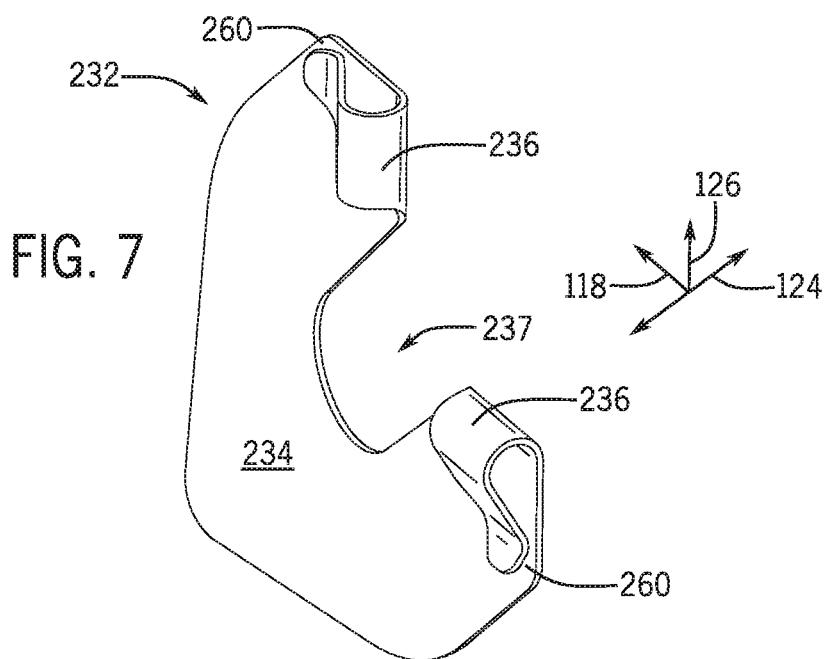
FIG. 7 is a perspective view of a divider member of the metering assembly of FIG. 2.

Additionally, as shown in FIGS. 6 and 7, the metering assembly 203 may include a plurality of divider members 232. As shown in FIG. 7, the divider member 232 may include a barrier wall 234 and one or more retainers 236. The barrier wall 234 may be a relatively flat plate of material, such as a polymeric material. The barrier wall 234 may include a notch-like opening 237 in some embodiments. The opening 237 may receive the shaft 208 of the metering element 206 as shown in FIG. 6. In some embodiments, the barrier wall 234 may be substantially C-shaped and may include retainer 236 at each end. The retainers 236 may be integrally attached to the barrier wall 234 so as to be monolithic. The retainers 236 may be configured as resiliently flexible clips in some embodiments; however, it will be appreciated that the retainers 236 could be bolts, separate fasteners, or other components without departing from the scope of the present disclosure. In some embodiments, the retainer 236 may curve away from the barrier wall 234 and back toward the barrier wall 234. Accordingly, the retainer 236 may define an open end 260. As shown in FIG. 7, the retainers 236 of the divider member 232 may have different orientations relative to each other. For example, the orientation of one retainer 236 may be oriented approximately ninety degrees (90°) relative to the other (i.e., orthogonal orientations). Stated differently, the open end 260 of one retainer 236 may be directed along the fore-aft axis 118, and the open end 260 of the other retainer 236 may be directed along the vertical axis 126.

As shown in FIG. 6, the divider member 232 may be removably attached to a side wall 218 of a commodity tube 216. Specifically, the open ends 260 of the retainers 236 may receive a lip 262 of the commodity tube 216 proximate the first end 220 of the passage 225. (One retainer 236 may receive a vertical lip 262, and the other retainer 236 may receive a horizontal lip 262 as shown.) The lip 262 may include an enlarged ridge 263. Once attached, the resiliency of the retainers 236 and the enlarged ridge 263 may help retain the divider member 232 to the commodity tube 216. The barrier wall 234 may be received within and may be layered over the inner surface of the side wall 218. Also, the shaft 208 may be received within the opening 237 of the divider member 232. Accordingly, the barrier wall 234 may act as a barrier for directing the commodity as it falls through the commodity tube 216.

Furthermore, the divider member 232 may facilitate assembly, disassembly, and re-assembly of the metering element 206. For example, because of the orientation of the retainers 236, the divider member 232 may be retained to the side wall 218 and, yet, may float along at least two axes (e.g., the fore-aft axis 118 and the vertical axis 126). This may facilitate installation of the metering element 206. In some cases, the divider members 232 or other components may be slightly misaligned. Regardless, the metering element 206 may be inserted, pushing the divider member 232 into alignment due to the orientation of the retainers 236.

During operation of the metering assembly 203, the metering element 206 may rotate about the axis of the shaft 208. Commodity from the trough member 156 may fall onto the wheels 210 of the metering element 206. As the metering element 206 rotates, the commodity may fall from the wheels 210 and into the first end 220 of the passage 225. The commodity may fall through the passage 225 and exit the commodity tube 216 through the second end 222.

Referring now to FIGS. 2-4, 13, and 14, the airflow system 132 will be discussed in greater detail. As mentioned above, the airflow system 132 may include a fan 134 that generates the airflow (FIG. 3). The airflow system 132 may also include at least one upstream duct structure 266 that is fluidly connected to the fan 134 to receive airflow therefrom. The airflow system 132 may further include at least one plenum assembly 268, which is fluidly connected to the upstream duct structure 266 to receive airflow therefrom. In some embodiments, the plenum assembly 268 may also receive the commodity metered out from the metering assembly 203, and blow the commodity toward the distribution system 136 for delivery to the soil.

As shown in FIGS. 2 and 4, there may be a first plenum assembly 268 and a second plenum assembly 270. Accordingly, each metering assembly 203 may have an associated plenum assembly 268, 270. The plenum assemblies 268, 270 may be substantially similar to each other.

Figure 13:
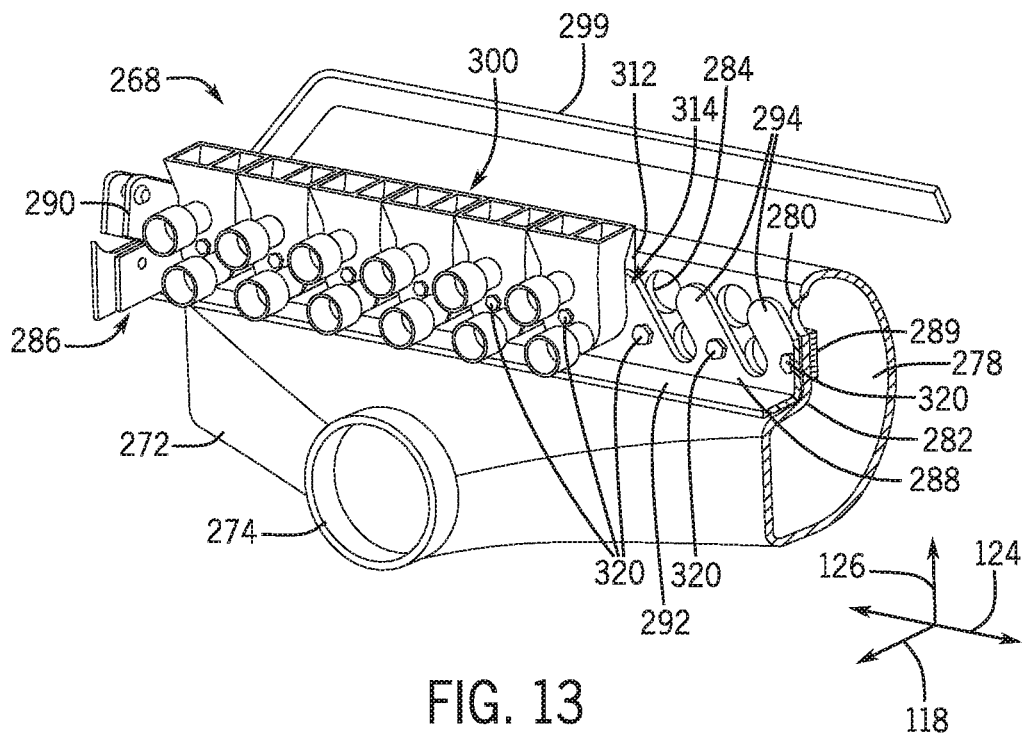
FIG. 13 is a perspective view of the plenum assembly of FIG. 2.

As shown in FIGS. 3 and 13, the plenum assembly 268 may include a plenum 272. The plenum may be a hollow member with an inlet end 274 and an outlet end 280. The plenum 272 may define an axis 276 that extends between the inlet end 274 and the outlet end 280. The inlet end 274 may be substantially circular in cross section. The inlet end 274 may be fluidly connected to the upstream duct structure 266. The plenum 272 may taper outward in width (i.e., along the lateral axis 124) as the plenum 272 extends in a downstream direction from the inlet end 274, generally rearward toward a curved segment 278. The axis 276 may turn forward through the curved segment 278. Also, the plenum 272 may include a stepped wall 282 that defines the outlet end 280. The wall 282 may include a plurality of apertures 284 (e.g., through-holes) extending therethrough.

The plenum assembly 268 may also include a plenum support structure 286. The plenum support structure 286 may be made from a rigid and strong material, such as steel. In some embodiments, the support structure 286 may include a mount 288 and a bracket 290 (FIG. 13). The mount 288 may include a base flange 292 that extends along the lateral axis 124. The mount 288 may further include a plurality of projections 294. The projections 294 may be spaced apart along the lateral length of the mount 288. As shown, the projections 294 may extend from the base flange 292 at an angle (e.g., at an acute angle relative to the lateral axis 124 and the vertical axis 126. The mount 288 may additionally include a backing plate 289. The backing plate 289 may be disposed inside the plenum 272. The projections 294 and the backing plate 289 may sandwich a part of the stepped wall 282 therebetween and a plurality of fasteners 320 may be used for attaching the mount 288 to the stepped wall.

Figure 10:
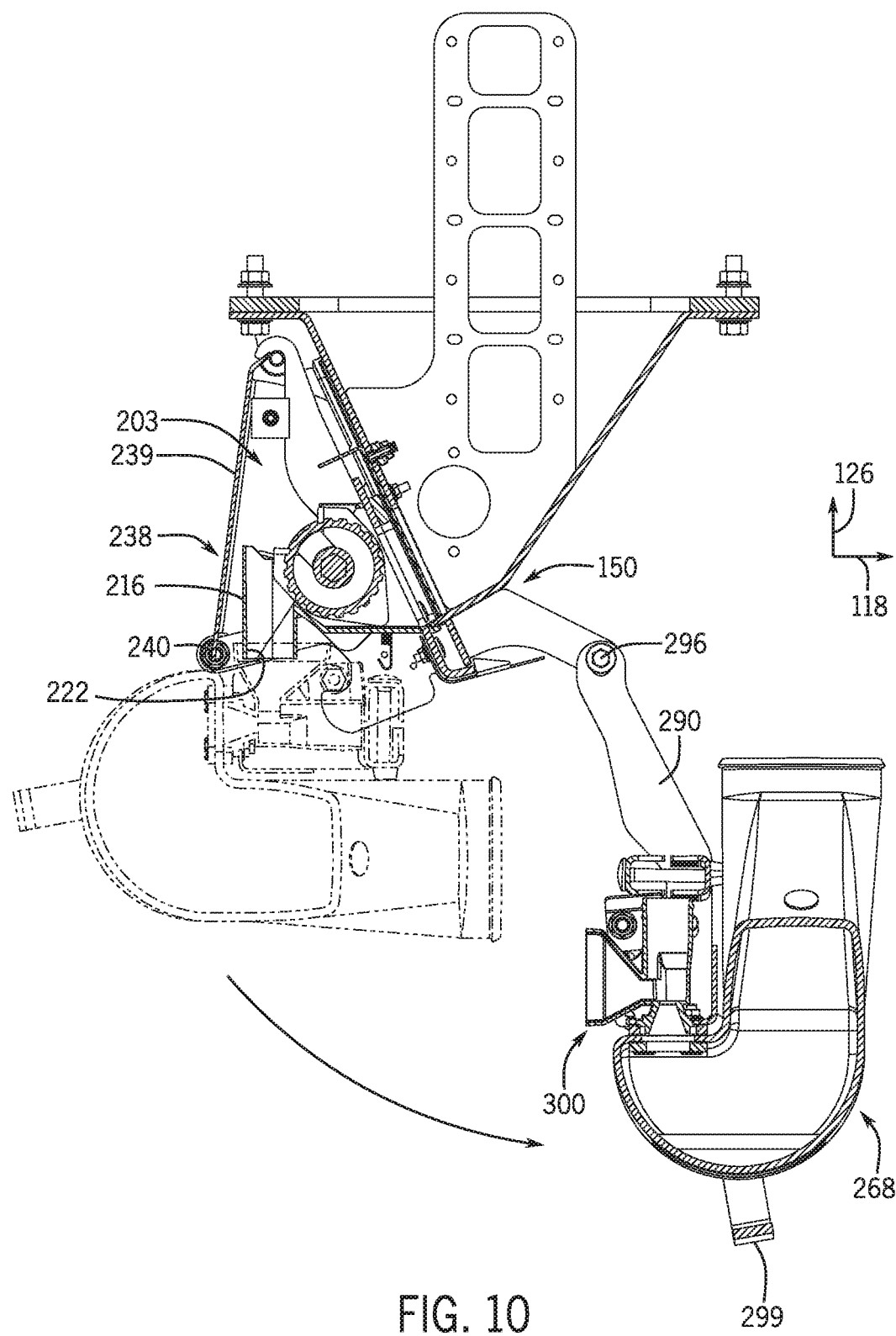
FIG. 10 is a section view showing movement of the plenum assembly from a raised position to a lowered position is shown.

The brackets 290 may be attached to opposite ends of the mount 288 as shown in FIG. 2. The brackets 290 may also be attached to the frame 150 at a third joint 296 (FIG. 10). In some embodiments, the brackets 290 may support rotational movement of the plenum assembly 268 relative to the frame 150 about the third joint 296. The axis of rotation of the third joint 296 may extend substantially parallel to the lateral axis 124. Thus, the plenum assembly 268 may rotate between a raised position (shown in phantom in FIG. 10) and a lowered position (shown in solid lines). The plenum assembly 268 may rotate generally downward and forward when moving from the raised position to the lowered position. The plenum assembly 268 may also include a retainer (e.g., a latch) for retaining the plenum assembly 268, for example, in the raised position. In some embodiments, the plenum assembly 268 may be connected to a portion of the metering assembly 203 when in the raised position, and the plenum assembly 268 may be spaced apart from the metering assembly 203 when in the lowered position.

In some embodiments, the plenum assembly 268 may be lowered manually without the aid of extra tools. Also, the plenum assembly 268 may include a handle 299. The handle 299 may be attached to the support structure 286 and may extend laterally across the curved segment 278 of the plenum 272. The user may grasp the handle 299 for raising and lowering the plenum assembly 268.

It will be appreciated that the range of motion of the plenum assembly 268 (between the raised position and the lowered position) is relatively large (e.g., at least eighty degrees of rotation about the third joint 296). Accordingly, the plenum assembly 268 may swing downward and lowered out of the way to provide access to the metering assembly 203. For example, the plenum assembly 268 may be lowered to provide access to the second end 222 of the commodity tubes 216. In some embodiments, the plenum assembly 268 may swing far enough to allow access to the commodity tubes 216 along the axis 227 in an upstream direction (i.e., toward the first end 220). In other words, the plenum assembly 268 may move far enough such that the axis 227 does not intersect the plenum assembly 268 as it extends out from the second end 222 of the commodity tube 216. Accordingly, the plenum assembly 268 may be lowered to expose the metering assembly 203, for example, when cleaning out the metering assembly 203.

Additionally, as shown in FIG. 4, when the plenum assembly 268 is lowered, the covering structure 238 may be flipped down to the third position, wherein the covering structure 238 exposes the metering assembly 203 and is substantially perpendicular to the ground. This allows for increased access to the metering assembly 203.

Figure 14:
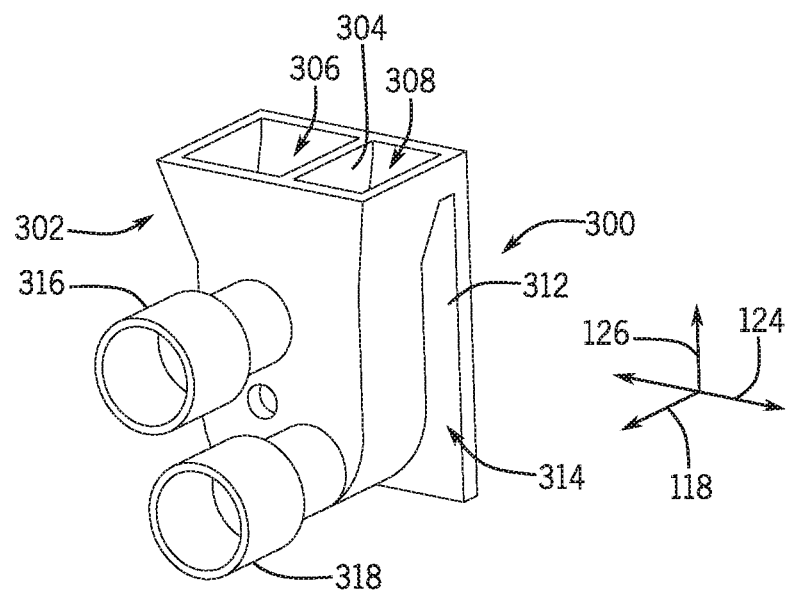
FIG. 14 is a perspective view of a venturi structure of the plenum assembly of FIG. 13.

As shown in FIGS. 13 and 14, the plenum assembly 268 may further include at least one venturi structure 300. The venturi structure 300 may be a unitary, one piece member in some embodiments. The venturi structure 300 may be made from a polymeric material in some embodiments. The venturi structure 300 may also be formed via molding, casting, additive manufacturing, or using other techniques.

The venturi structure 300 may include a funnel portion 302 (i.e., a support structure). The funnel portion 302 may include a divider wall 304. The divider wall 304 may divide the interior of the funnel portion 302 into a first passage 306 and a second passage 308. The venturi structure 300 may also include a support plate 312 that extends from an upper lip of the funnel portion 302. A slot 314 may be defined between the support plate and the funnel portion 302.

Additionally, the venturi structure 300 may include a first venturi tube 316 and a second venturi tube 318. The first and second venturi tubes 316, 318 may extend through the support plate 312 and may project forward from the funnel portion 302. The first venturi tube 316 may be fluidly connected to the first passage 306. Also, the first venturi tube 316 may extend substantially perpendicular relative to the first passage 306. Furthermore, the second venturi tube 318 may be fluidly connected to the second passage 308 and may extend substantially perpendicular thereto.

In some embodiments, the first and second venturi tubes 316, 318 may be offset along the lateral axis 124 with respect to each other. Also, the first and second venturi tubes 316, 318 may be offset along the vertical axis 126 with respect to each other.

The venturi structure 300 may be removeably attached to the plenum 272 and/or the mount 288. For example, the projection 294 of the mount 288 may be received within the slot 314 of the venturi structure 300. Moreover, a respective one of the fasteners 320 may extend through the projection 294, the stepped wall 282 of the plenum 272, the support plate 312 of the venturi structure 300, and the backing plate 289 to secure the venturi structure 300 to the plenum 272 and the plenum support structure 286. In some embodiments, the fastener 320 may be the only fastener needed for attaching the venturi structure 300. Thus, the venturi structure 300 may be installed and removed relatively quickly and conveniently.

Also, the inlet ends of the first and second venturi tubes 316, 318 may be fluidly connected to respective ones of the apertures 284 of the plenum 272. The outlet ends of the venturi tubes 316, 318 may be connected to respective hoses 322 of the distribution system 136 (FIG. 3).

It will be appreciated that the staggered arrangement of the venturi tubes 316, 318 may make the plenum assembly 268 relatively compact. Accordingly a large number of venturi tubes 316, 318 may be arranged along the lateral axis 124, and yet there can be enough room for the hoses 322 of the distribution system 136 and other structures on the work vehicle 100.

As represented in FIG. 3, the work vehicle 100 may further include a control system 350. The control system 350 may include and/or communicate with components of a computerized device, such as a processor, a data storage device, a user interface with a display and a keyboard or other related devices, etc. The control system 350 may communicate with an actuator 352. In some embodiments, the actuator 352 may be operably connected to the metering element 206 for driving (e.g., rotating) the metering element 206. The actuator 352 may be of any suitable type, such as an electric motor, a hydraulic actuator, or otherwise. Also, the control system 350 may be in communication with a sensor 354 configured to detect a speed (e.g., an angular speed) of the actuator 352 and/or the metering element 206. The sensor 354 may be an optical sensor, an electrical sensor, or other type without departing from the scope of the present disclosure. Accordingly, in some embodiments, the control system 350 may control the motor 356 and receive associated feedback from the sensor 354 for closed-loop control. Also, in some embodiments, the control system 350 may be in communication with the fan 134 for controlling the airflow system 132. It will be appreciated that the control system 350 may be in communication with and may control other systems as well.

As shown in FIGS. 2 and 4, the actuator 352 may include an electric motor 356. The electric motor 356 may include a first output member 358 and a second output member 360. The first output member 358 may be a shaft that is attached directly to the motor 356. The second output member 360 may be a gear or other transmission component that selectively engages with the first output member 358. The second output member 360 may be operably connected to the metering element 206. As shown in FIG. 2, the first and second output members 358, 360 may be engaged such that power output from the motor is transferred to the metering element 206. In contrast, as shown in FIG. 12, the first and second output members 358, 360 may disengage when moving the metering assembly 203 from the lowered position to the raised position.

Accordingly, during operation, the work vehicle 100 may be towed across a field with the metering assembly 203, and the plenum assembly 268 in the positions shown in FIG. 3 (i.e., the metering assembly 203 in the retracted position and the plenum assembly 268 in the raised position). The control system 350 may generate control signals for operating the electric motor 356 at a controlled speed, such that the metering element 206 meters out a predetermined amount of the commodity from the commodity container 128. The commodity may travel through the commodity tube 216 and fall into either the first passage 306 or second passage 308 of the venturi structure 300. The commodity may be ejected from the venturi structure 300 toward the distribution system 136 and ultimately to the soil.

There may be a need to clean out the metering assembly 203. For example, the user may want to plant a different commodity than the one currently loaded. Internal components may also need to be reconfigured, replaced, repaired, etc. Advantageously, the metering assembly 203 and the plenum assembly 268 may move between various positions to facilitate clean-out, repair, etc.

For example, the metering assembly 203 and the plenum assembly 268 can be conveniently moved and accessed from the rear side 116 of the vehicle 100. As shown in FIG. 1, the metering assembly 203 may be disposed between the central wheels 112 of the vehicle 100, allowing user access. Also, the metering assembly 203 may be disposed rearward with respect to the cutters, tillers, or other ground-engaging tools of the ground system 138. More specifically, the metering assembly 203 may be disposed at a first axial position 101, whereas the ground engaging-tools of the ground system 138 may be disposed at a second axial position 103. The first axial position 101 may be disposed rearward on the axis 118 relative to the second axial position 103. Accordingly, the user may access the metering assembly 203 without interference from the ground system 138.

Figure 5:
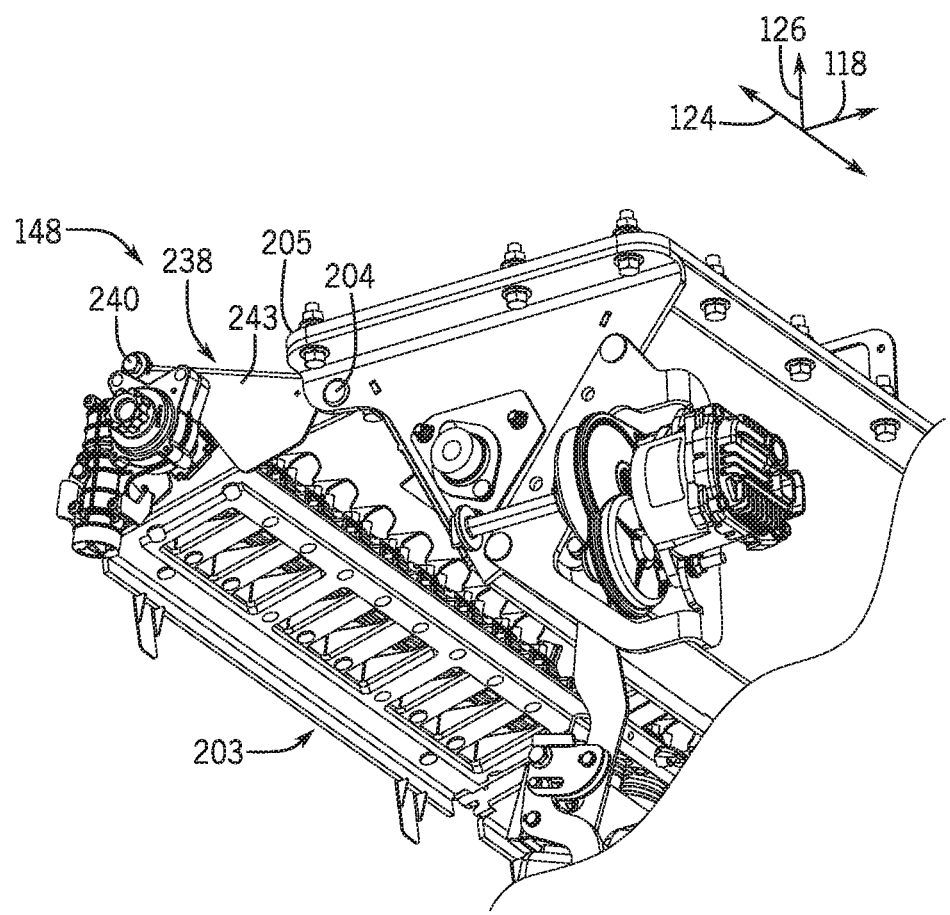
FIG. 5 is a lower perspective view, wherein the metering assembly is shown in an extended position.

Also, to access internal components of the metering assembly 203 and/or the plenum assembly 268, the user manually uses the handle 299 to rotate and lower the plenum assembly 268 as represented in FIG. 10. In this position, the user may probe the second end 222 of the commodity tube 216. Furthermore, the user may rotate and lift the metering assembly 203 as represented in FIG. 11. This provides access to the metering assembly 203 as represented in FIG. 5. Moreover, the user may rotate and flip over the covering structure 238 as represented in FIG. 12.

Furthermore, the metering assembly 203 may be disposed high enough off of the ground to allow a receptacle 397 (e.g., a probox) to be placed underneath the metering assembly 203. In some embodiments, with the plenum assembly 268 lowered and moved forward, the metering assembly 203 may disposed at a height 399 (measured from the ground, soil, etc.) of at least sixty-five inches (65 in.) to accommodate the receptacle 397. The underside of the metering assembly 203 may be at least sixty-five inches off the ground in the lowered position (FIG. 11) as well. Accordingly, the receptacle 397 may be used to conveniently capture the commodity cleaned out of the metering assembly 203.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
    a commodity container; and
    a metering system configured to meter a commodity out from the commodity container, the metering system including a metering element, a support structure, and a latch mechanism with a biasing member;
    the latch mechanism configured to move between a latched position and an unlatched position;
    the latch mechanism, in the latched position, retaining the metering element to the support structure;
    the latch mechanism, in the unlatched position, releasing the metering element from the support structure;
    the biasing member biasing the latch mechanism toward the latched position;
    the latch mechanism abuts the metering system and moves the metering element away from the support structure as the latch mechanism moves from the latched position toward the unlatched position.

2. The work vehicle of claim 1, wherein the metering element includes a roller that is supported by a bearing structure;
    wherein the latch mechanism, in the latched position, is received within a notch of the bearing structure.

3. The work vehicle of claim 1, wherein the latch mechanism includes a lever that is attached for rotation relative to the support structure as the latch mechanism moves between the latched position and the unlatched position;
    wherein the lever includes a first end and a second end;
    wherein the first end is configured to engage the metering element when the latch mechanism is in the latched position; and
    wherein the second end is configured to push the metering element away from the support structure as the latch mechanism moves away from the latched position and toward the unlatched position.

4. The work vehicle of claim 1, wherein the latch mechanism includes a lever having a first portion and a second portion at a distance from the first portion; and
    wherein the lever is configured so that the first portion engages a bearing structure supporting a roller of the metering element when the lever is in the latched position and the second portion engages the bearing structure when the lever is in the unlatched position.

5. The work vehicle of claim 4, wherein the first portion of the lever defines a hook configured to engage the bearing structure when the lever is in the latched position.

6. The work vehicle of claim 5, wherein the bearing structure has a notch at which the hook engages the bearing structure when the lever is in the latched position.

7. The work vehicle of claim 4, wherein the second portion of the lever abuts the bearing structure and moves the metering element away from the support structure as the lever moves from the latched position toward the unlatched position.

8. The work vehicle of claim 4, wherein the lever is L-shaped.

9. A work vehicle having a commodity container comprising:
    a metering system configured to meter a commodity out from the commodity container, the metering system including a metering element, a support structure, and a latch mechanism with a biasing member;
    the latch mechanism configured to move between a latched position and an unlatched position;
    the latch mechanism, in the latched position, retaining the metering element to the support structure;
    the latch mechanism, in the unlatched position, releasing the metering element from the support structure;
    the biasing member biasing the latch mechanism toward the latched position;
    the latch mechanism abuts the metering system and moves the metering element away from the support structure as the latch mechanism moves from the latched position toward the unlatched position.

10. The work vehicle of claim 9, wherein the metering element includes a roller that is supported by a bearing structure;
    wherein the latch mechanism, in the latched position, is received within a notch of the bearing structure.

11. The work vehicle of claim 9, wherein the latch mechanism includes a lever that is attached for rotation relative to the support structure as the latch mechanism moves between the latched position and the unlatched position;

wherein the lever includes a first end and a second end;

wherein the first end is configured to engage the metering element when the latch mechanism is in the latched position; and wherein the second end is configured to push the metering element away from the support structure as the latch mechanism moves away from the latched position and toward the unlatched position.

12. The work vehicle of claim 9, wherein the latch mechanism includes a lever having a first portion and a second portion at a distance from the first portion; and wherein the lever is configured so that the first portion engages a bearing structure supporting a roller of the metering element when the lever is in the latched position and the second portion engages the bearing structure when the lever is in the unlatched position.

13. The work vehicle of claim 12, wherein the first portion of the lever defines a hook configured to engage the bearing structure when the lever is in the latched position.

14. The work vehicle of claim 13, wherein the bearing structure has a notch at which the hook engages the bearing structure when the lever is in the latched position.

15. The work vehicle of claim 12, wherein the second portion of the lever abuts the bearing structure and moves the metering element away from the support structure as the lever moves from the latched position toward the unlatched position.

16. The work vehicle of claim 12, wherein the lever is L-shaped.

17. The work vehicle of claim 16, wherein the latch mechanism includes a lever that is attached for rotation relative to the support structure as the latch mechanism moves between the latched position and the unlatched position;

wherein the lever includes a first end and a second end;

wherein the first end is configured to engage the metering element when the latch mechanism is in the latched position; and wherein the second end is configured to push the metering element away from the support structure as the latch mechanism moves away from the latched position and toward the unlatched position.

18. The work vehicle of claim 12, wherein the first portion of the lever defines a hook configured to engage a notch in the bearing structure when the lever is in the latched position; and wherein the second portion of the lever abuts the bearing structure and moves the metering element away from the support structure as the lever moves from the latched position toward the unlatched position.

19. A work vehicle having a commodity container and a metering system configured to meter a commodity out from the commodity container, the metering system including:

a metering element having a roller;

a support structure to which the roller of the metering element is mounted by a bearing structure;

a latch mechanism configured to move between a latched position and an unlatched position in which the latch mechanism, in the latched position, retains the metering element to the support structure and, in the unlatched position, releases the metering element from the support structure; and a biasing member biasing the latch mechanism toward the latched position;

wherein the latch mechanism abuts the metering system and moves the metering element away from the support structure as the latch mechanism moves from the latched position toward the unlatched position.

20. The work vehicle of claim 19, wherein the latch mechanism includes an L-shaped lever having a first portion and a second portion at a distance from the first portion; and wherein the lever is configured so that the first portion engages a bearing structure supporting a roller of the metering element when the lever is in the latched position and the second portion engages the bearing structure when the lever is in the unlatched position.

* * * * *